US008200249B2

(12) United States Patent
Lipovski

(10) Patent No.: US 8,200,249 B2
(45) Date of Patent: Jun. 12, 2012

(54) SYSTEM FOR ENABLING OR RESTRICTING CERTAIN CELLULAR TELEPHONE DEVICE CAPABILITIES IN CERTAIN ZONES

(76) Inventor: Gerald John (Jack) Lipovski, Austin, TX (US)

(*) Notice: Subject to any disclaimer, the term of this patent is extended or adjusted under 35 U.S.C. 154(b) by 1187 days.

(21) Appl. No.: 11/865,810

(22) Filed: Oct. 2, 2007

(65) Prior Publication Data

US 2008/0214211 A1 Sep. 4, 2008

Related U.S. Application Data

(63) Continuation-in-part of application No. 10/687,024, filed on Oct. 16, 2003, now Pat. No. 7,142,877, which is a continuation of application No. 09/384,723, filed on Aug. 27, 1999, now Pat. No. 6,675,002.

(60) Provisional application No. 60/936,605, filed on Jun. 21, 2007.

(51) Int. Cl.
*H04Q 7/20* (2006.01)

(52) U.S. Cl. ..................... 455/456.4; 455/403

(58) Field of Classification Search ............... 455/422.1, 455/456.1, 456.4, 456.5, 456.6, 457, 460, 455/403

See application file for complete search history.

(56) References Cited

U.S. PATENT DOCUMENTS

| | | | | |
|---|---|---|---|---|
| 6,085,096 A * | 7/2000 | Nakamura | ................. | 455/456.6 |
| 6,212,390 B1 * | 4/2001 | Rune | ......................... | 455/456.6 |
| 6,490,455 B1 * | 12/2002 | Park et al. | .................. | 455/456.4 |
| 6,622,020 B1 * | 9/2003 | Seki | ............................. | 455/456.2 |
| 6,782,266 B2 * | 8/2004 | Baer et al. | .................. | 455/456.4 |
| 2009/0305666 A1 * | 12/2009 | Tian et al. | ..................... | 455/410 |

* cited by examiner

*Primary Examiner* — Cong Tran

(57) ABSTRACT

A system for selectively restricting or enabling the use of a cellular telephone module in a zone is described, comprising: a control signal transmitter for generating a control signal at an entrance to the zone or alternatively generating control signals throughout the zone; the cellular telephone including a module; a receiver module within the cellular telephone responsive to the control signal for generating a module enable/restrict upon receipt of the control signal; and a switch within the cellular telephone responsive to the module enable/restrict for selectively enabling or inhibiting the operation of the module for a predetermined period of time after receipt of the control signal. Additionally, this system's cellular telephone can dial a telephone, send a message to it, receive a text message from it, and send digits to it, to handle emergencies or conduct business. Finally, the system can remind owners to recharge their cellular telephone batteries.

18 Claims, 5 Drawing Sheets

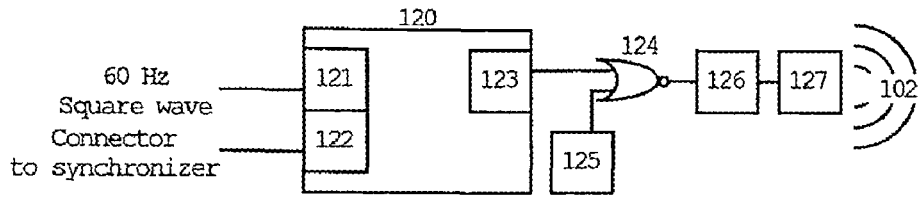

FIG. 4 volatile unsigned short EPDDR@0x10007002, EPDR@0x10007004, U0RX@0x10009000,
U0TX@0x10009040, U0CR1@0x10009080, U0CR2@0x10009082,
U0BRGR@0x10009084, U0SR@0x10009086, U0PCR@0x1000908A,
EPPAR@0x10007000, EPFR@0x10007006;                                    ⸺ 129 enum{ UART_EN = 1, TXEN = 0x1000, RXEN = 0x100, IRTS = 0x4000, WS = 0x20,
TRDY = 0x2000, RRDY = 0x100};                                         ⸺ 130

FIG. 5

```
                       131
void init() {        ⸺                                               132
  U0BRGR=3333; /* 600 baud if system clock is 32 MHz */             ⸺
  U0PCR = 2; // Txd pins used by UART0
  U0CR1 = UART_EN + TXEN; // enable UART transmitter
  U0CR2 = IRTS + WS; // disable hardware RTS control, have 8-bit data frame
  EPPAR = 5; // make both inputs rising edge sensitive
}                                                                    133
                                    134
void put() { short i; static char count;   ⸺ 135
  if(((i = EPFR) & 1) == 0) return;        ⸺ 136
  EPFR = i; if(i & 2) count = 0;                                     137
  if((((count++) & 3) == 0) && (U0SR & TRDY)) U0TX = 0x8d;          ⸺
}
```

FIG. 6

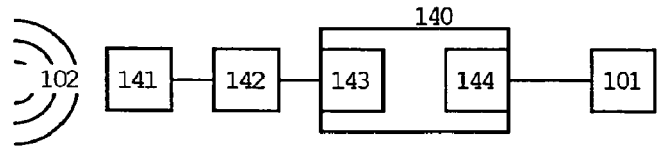

FIG. 7

```
                          150
void init(){
  U0BRGR=3333; /* 600 baud if system clock is 32 MHz */      151
  U0PCR = 1; // Rxd used by UART0
  U0CR1 = UART_EN + RXEN; // enable UART receiver
  U0CR2 = IRTS + WS; // disable hardware RTS control, have 8-bit data frame
  EPDDR = 1; // make port bit 0 an output
}                                                            152
                    153
void check() { short i = 0, j;
  while(U0SR & RRDY) {                                       154
    if((j = U0RX) & 0x4000) ;                                155
      else if(j == 0x8d) i = 1; // output 1 to mute device   156
      else if(j == 0xae) timeout = N; // mute for next 3 hours  157
      else if(j == 0xe6) timeout = 0; // cancel mute timeout    158
  }                                      159
  if(timeout) i = 0; //                  160    FIG. 8
    EPDR = i; // output chosen value        161
}
```

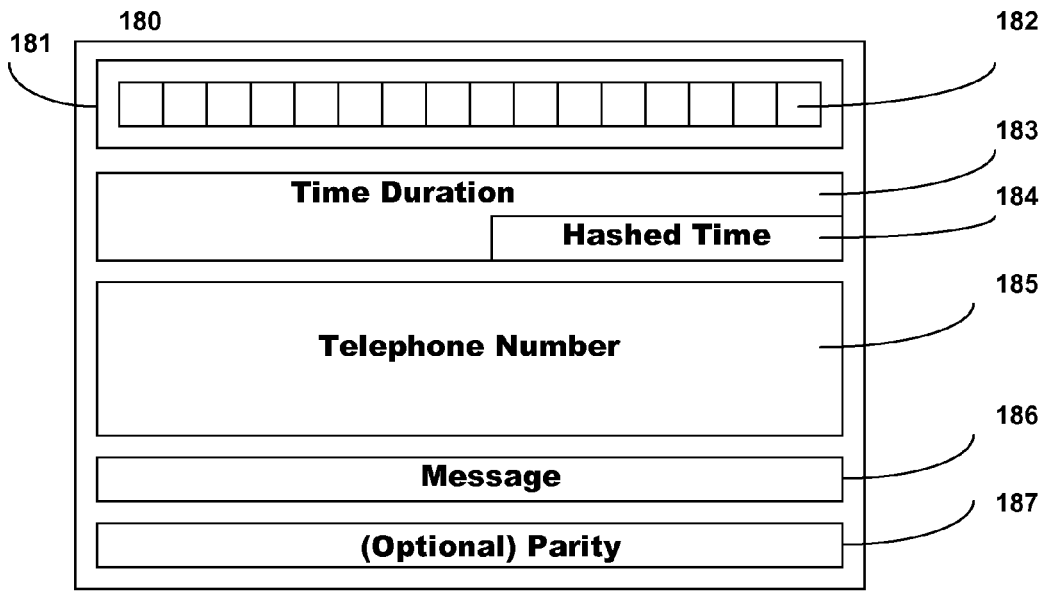

FIG. 9

SYSTEM FOR ENABLING OR RESTRICTING CERTAIN CELLULAR TELEPHONE DEVICE CAPABILITIES IN CERTAIN ZONES

RELATED U.S. APPLICATION DATA

This application is a Continuation-in-part of application Ser. No. 10/687,024, filed Oct. 16, 2003 now U.S. Pat. No. 7,142,877, which is a Continuation of application Ser. No. 09/384,723, filed Aug. 27, 1999 now U.S. Pat. No. 6,675,002. This application also claims benefit of co-pending patent application Ser. No. 11/511,723, filed Aug. 29, 2006, and U.S. Provisional Application 60/936,605, filed Jun. 21, 2007

BACKGROUND OF THE INVENTION

This invention is in the field of automatically enabling or restricting certain capabilities of cellular telephone devices in response to being in certain areas.

People attending a concert, or similar event, are distracted and irritated when cellular telephones and pagers ring. During a quiet and delicate passage, a musician can be distracted by a ringing cellular telephone, stopping the performance. Attendees at churches, synagogues, lecture halls, and even restaurants are similarly distracted by cellular telephones, pagers, wrist watches, and other electronic devices that reproduce or generate audio signals. Cellular telephones should not be used in airplanes. However, individuals do not have the courtesy to turn these devices off, or at least, mute them, when they might distract others or interfere with navigation.

Nevertheless, it is possible to automatically mute these devices by making a signal present in the concert hall, or similar area (restricted area), or through entrances or exits to these areas, which can be received by the offending device (restricted device). This inventive system will automatically mute all restricted devices in restricted areas, provided that restricted areas, or entrances to, and possibly exits from, the areas are equipped with a transmitter apparatus, and all restricted devices are fitted with a receiver apparatus, according to this invention.

Having provided devices that are needed to restrict ringing according to the parent patent (the '877), or radio-frequency transmissions from a cellular telephone according to the parent patent (the '002), these aforementioned devices can be extended to restrict other operations that are normally permitted in cellular telephones, enable certain operations that are not normally done in cellular telephones, or cause certain operations to be performed that are not normally done in cellular telephones. This continuation-in-part application exhibits enabling, restricting or causing further operations in areas where such operations are to be restricted, enabled or caused to be performed.

SUMMARY OF THE INVENTION

The present invention provides a system and method for restricting a cellular telephone's operations that are normally permitted, for enabling operations that are not normally permitted, and for causing certain operations to be executed. This inventive system can inhibit various operations that are normally permitted when using a cellular telephone, or it can enable or execute various operations that are not normally provided to cellular telephone clients. This inventive system can cause the cellular telephone to send a predetermined 2-byte message to a BCD 12-digit 6-byte telephone number, the telephone selected by the 12-digit telephone number (dialed telephone) able to send a text message to the cellular telephone, which may responded by sending digits to the dialed telephone. The message and telephone number can be used to allow authorities to detect cellular telephones near high-value terrorist targets, or to disseminate emergency messages during a disaster. It can cause the dialed telephone to send a video to the cellular telephone over the cellular telephone channel, for a real-estate agent to show houses, or for video to be sent over the cellular telephone channel when the cellular telephone is near a billboard to further explain what the billboard advertises. The message, telephone number, and responding digits can be used to purchase goods or services, unlock doors, or turn on lights or appliances. Finally this inventive system can cause a cellular telephone, whose battery is not charged or being charged, to emit a sound that the user responds to by putting the cellular telephone into its cradle, to charge its battery. The system includes a transmitter apparatus that sends a control signal to the electronic device apparatus, such electronic device apparatus being capable of receiving the control signal and further being capable of enabling, restricting, or causing execution of an operation in response thereto.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 4 is a preferred embodiment design of a transmitter.

FIG. 5 is a C language declaration of ports used in FIG. 6 and FIG. 8.

FIG. 6 is a pair of C language procedures executed in the transmitter.

FIG. 7 is a first preferred embodiment design of a receiver.

FIG. 8 is a pair of C language procedures executed in the receiver.

FIG. 9 is a representation of a packet of data transmitted through the control signal channel according to the second preferred embodiment.

DESCRIPTION OF THE PREFERRED EMBODIMENT

A high-level view of the operation of this system is presented first. Then a concrete design of a preferred embodiment is presented later.

Figure 1:
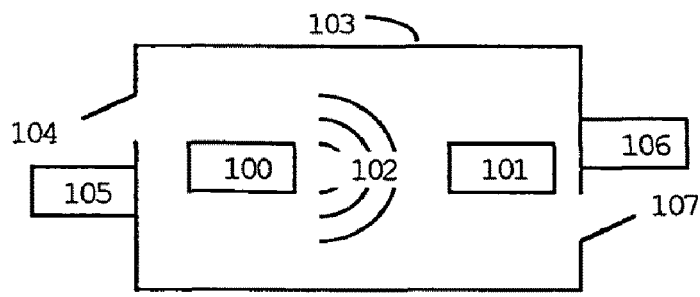
FIG. 1 is a top plan view of the general organization of the system constructed in accordance with the general principles of the present invention.

FIG. 1 illustrates the general organization of this system. A restricted area 103 may be protected by one of three operating modes or a combination thereof. In a first mode, the restricted area has one or more control signal transmitters (CSTs) 100, and one or more restricted devices 101 may be carried by persons in the area. The control signal 102 passes throughout (blankets) the restricted area 103. Whenever restricted device 101 receives the control signal 102, it will be muted. Alternatively in a second operating mode, a first CST 105 may be placed by each entrance 104 to a restricted area 103, and a second CST 106 may be placed by each exit 107 from a restricted area 103. When a restricted device 101 receives a control signal from first CST 105, it is muted until the restricted device 101 receives a control signal from second CST 106. In a variation of this mode, for instance in an airport jetway, a second control signal is emitted near the airport terminus of the jetway, and the first control signal is emitted near the airplane terminus of the jetway. As a restricted device passes through the jetway into an airplane, the last-met signal mutes the device before it enters the airplane, and as a restricted device passes through the jetway out of an airplane, the last-met signal restores the device to the non-muted state before it enters the airport. Finally, in a third operating mode, a CST 105 may be placed by each entrance 104 to a restricted area 103. Upon receipt of a control signal from CST 105, a restricted device 101 is muted for a period of time, such as three hours.

In this preferred embodiment, essentially the same hardware is used for all three modes to reduce cost. The preferred control signal is ultrasound, because in an area-blanketing mode, this signal should have radiation coverage that is similar to the objectionable sound that it mutes, but must not be objectionable itself But without departing from the spirit of this invention, any combination of the aforementioned modes may be implemented, each mode may use different hardware, or the control signal can be a limited-range radio wave, infrared signal, or other local signal that can broadcast over the entire restricted area, possibly by using multiple CSTs in the restricted area, and not broadcast significantly, or be present coincidentally, beyond this area.

Figure 2:
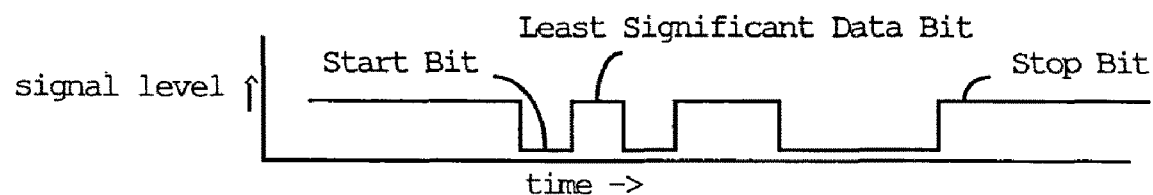
FIG. 2 is a description of a control signal sent from transmitter to receiver.

The ultrasonic signal should be an unusual pattern of ultrasonic bursts. Otherwise devices like ultrasonic pest deterrents and ultrasonic distance measurement devices, which emit continuous ultrasonic energy, or simple repetitions of ultrasonic energy, might be used in nonrestrictive areas. Such CSTs should not accidentally mute restricted devices. Restricted electronic devices are generally controlled by microcontrollers. Most microcontrollers have at least one UART (Universal Asynchronous Receiver-Transmitter (or equivalent) module, or if not, many such UART modules are already designed and can be inexpensively included in the design of a special microcontroller used in restricted devices. Therefore the ultrasonic signal should be modulated by a communication packet (or packet) signal that is sent and that will be received by UARTs. This preferred embodiment will utilize three UART packets sent at 600 baud, having no parity bit and one stop bit, which (1) have binary pattern 10001101 or hexadecimal pattern in C notation, 0x8d (FIG. 2 shows such a signal at output RxD 123 in FIG. 4), (2) have binary pattern 10101110 or hexadecimal pattern 0xae, or (3) have binary pattern 11100110 or hexadecimal pattern 0xe6; each packet has a variation of single bit-wide pulses, and multiple bit-wide pulses, which is unlikely to appear in patterns generated by naturally occurring sources or in use for other communication or control applications. However, another communication packet structure, or a signal not presently used for communication, can be used without departing from the spirit of this invention.

Figure 3:
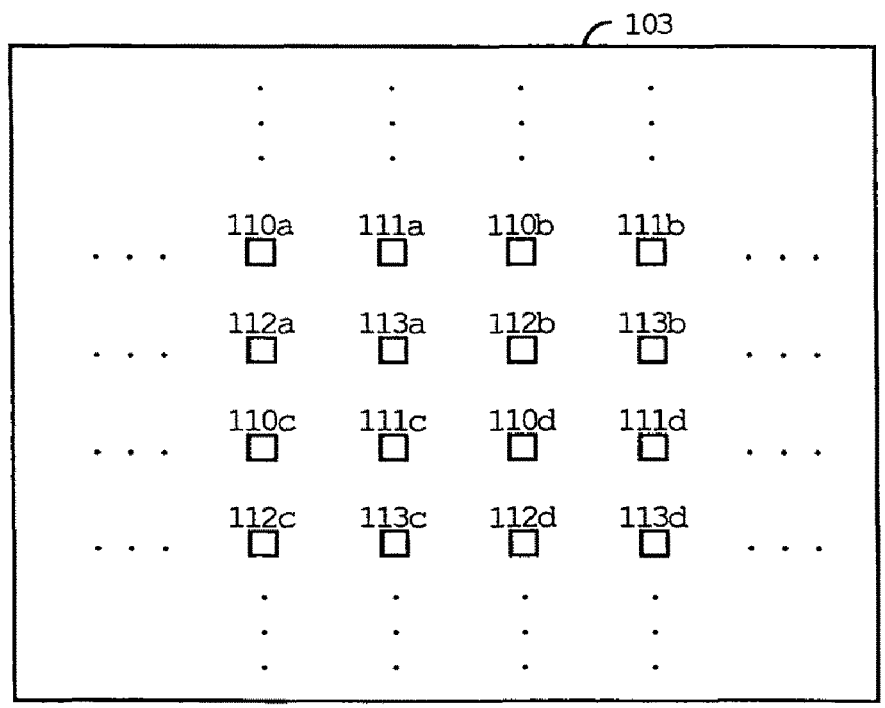
FIG. 3 is a description of a layout of multiple transmitters to cover a large restricted area.

The following discussion pertains mainly to area blanketing CSTs 100. A packet (frame) from CST 100 should be sent repetitively, but a signal should be quiescent for multiple consecutive packet times, so that if a plurality of CSTs are needed to cover a restricted area, different CSTs can transmit their packet when other neighboring CSTs are quiescent. This should be done so that a restricted device will receive a packet from at least one of the CSTs without interference from another CST that might cancel the signal. Further, if a signal is sent from a CST, and if interference from a reflected signal from the same CST cancels its signal, the restricted device should be able to receive a packet from another CST without it being cancelled. In this preferred embodiment, a packet is sent every four packet times by one CST. If a large number of CSTs are needed to cover a restricted area, CSTs can be arranged in a repetitive two-dimensional array pattern as shown in FIG. 3, where for purposes of description, CSTs are arranged in rows numbered consecutively from top to bottom, and in columns numbered consecutively from left to right. The CSTs will be synchronized to insure that any restricted device in the restricted area will receive at least one signal without cancellation by a signal sent by another CST. Each CST will send its packet in a time slot, and repeated each four time slots after that. A CST (110a, 110b, ...) in an even numbered row and even numbered column will send its packet in a packet time slot zero. A CST (111a, 111b, ...) in an even numbered row and odd numbered column will send its packet in a packet time slot one. A CST (112a, 112b, ...) in an odd numbered row and even numbered column will send its packet in a packet time slot two. A CST (113a, 113b, ...) in an odd numbered row and odd numbered column will send its packet in a packet time slot three. In the restricted area, any restricted device, receiving a signal from two different CSTs that might interfere with each other, will receive a signal from some other CST. This CST will be much closer to the receiver than any other CST that is sending a signal in the same packet time slot. Thus, a restricted device will receive a packet from at least one CST, without risk of cancellation by a signal from another CST. A control signal received from any CST will mute the restricted device for a time that is at least as long as the time between signals from that CST, which is four time slots in this preferred embodiment. When the restricted device is removed from the restricted area, it will not receive the control signal, and will not be muted. Use of another periodic packet structure, other than sending a packet every four packet times, does not significantly depart from the spirit of this invention. Sending packets in non-repetitive manner which are not synchronized with each other, such as sending packets at random times but with a predetermined maximum time between packets, does not significantly depart from the spirit of this invention.

The following discussion pertains to CSTs at entrances 105 and CSTs at exits 106. These CSTs should generate distinct packet patterns that are different from the packet pattern 0x8d chosen for area-blanketing CSTs 100. The packet pattern 0xae is generated by entrance CSTs 105 and the packet pattern 0xe6 is generated by exit CSTs 105. Upon receipt of an entrance packet pattern 0xae, the receiver will be muted, until an exit packet pattern 0xec is received. However the exit CST 106 might be inoperable or the electronic device 101 might be taken out of the restricted area without passing through an exit. In this case, the device 101 may be automatically restored to its non-muted state after a period of time, such as three hours, after it has been muted by an entrance packet pattern 0xae. In fact, if the device 101 is automatically restored to its non-muted state after a period of time, and that period of time is predetermined and is deemed acceptable for the event taking place in the restricted area, an exit signal may not be needed. However, a different period of time than three hours, or the absence of a timeout period, or a period of time that is selectable by sending different entrance packet patterns, can be used without departing from the spirit of this invention. Moreover, there being two to the power eight, 256, different packet patterns, only a few of which might be generated by pest deterrents and other devices used in non-restricted areas so they should not be used in this system, many different packet patterns can be transmitted by entrance CSTs 105 to selectively mute either radio-frequency generation or audio generation or both, and to selectively mute for various time periods such as ten minutes, twenty minutes, half an hour, and so on, until the device returns automatically to a non-muted state, or muted indefinitely, until an exit signal returns the device to a non-muted state.

A preferred embodiment design of an area-blanketing CST (100) is shown in FIG. 4. Microcontroller 120 may be an inexpensive low-power microcontroller designed for battery use, such as the Motorola MMC2001. For the detailed preferred embodiment following in this specification, the Motorola MMC2001 Reference Manual (MMC2001RM/D) is incorporated by reference. Parallel port EPDR bit 0 121 inputs a signal derived from household 110 volt 60 Hertz signal that is used to time the transmission of the control signal, and parallel port EPDR bit 1 122 inputs a signal from a connector that can be used to synchronize the signal to be sent in a selected packet time. Serial port TxD0 is connected to a NOR gate 124 whose other input is the output of 555 timer chip 125 that generates a 40 KHz wave form. Output of NOR gate 124 is connected to an amplifier 126 that drives an ultrasonic transducer 127. When UART signal 123 is low, NOR gate 124 outputs a high signal, and transducer 127 generates a 40 KHz ultrasonic signal.

The C language declarations in FIG. 5 are included in the program for an area-blanketing CST (FIG. 6) and in the program for a receiver (FIG. 8). The first statement 129 indicates the location of I/O ports in the MMC2001; for instance the first declaration indicates a 16-bit port called EPDDR at location 0x10007002. The second statement 130 indicates constant values that may be combined and stored in I/O ports; for instance the first definition UART_EN=1 indicates a symbolic name UART_EN will have a value of 1.

C language procedures for the area-blanketing CST are shown in FIG. 5. Procedure init( ) 131 is executed just after the microcontroller is reset, to configure the I/O devices. Line 132, and the following four lines, initialize UART0 for 600 Baud transmission of 8-bit data packets with no parity and one stop bit (assuming the MMC2001 has a 32 MHz clock rate). Line 133 initializes the edge port to recognize rising edge signals on edge port pins. Procedure put( ) 134 is executed at least once every 60th of a second, but can be executed more often in a loop if the remaining programs running in the microcontroller execute a loop in less than a 60th of a second. A rising edge of the 60 Hz square wave sets bit zero of port EPFR. Line 135 causes the procedure to return to the calling program if an edge did not occur. Line 136 clears the bits in EPFR that had been set to 1. To cause a CST to synchronize to the current 60 Hz period, a pulse is applied via a connector to bit 1 of the EPFR device, setting it. If bit 1 of EPFR was set when bit zero became set, then the static local variable COUNT is cleared. COUNT is incremented; if COUNT is an integer multiple of four, the pattern 0x8d is written into the UART transmit register, causing pattern 0x8d (FIG. 2) to be sent out 137. Thus, a CST 100 broadcasts an area-blanketing signal once every four periods of a 60 Hz waveform, and each packet, having 8 data, no parity, and one stop bits at 600 baud, is equal to a 60 Hz period, so it does not interfere with a packet sent by another CST that is close to it.

A CST at an entrance 105 or a CST at an exit 106 can be implemented in similar manner to that described above. It need not be synchronized to other CSTs, however, and it may emit its packet pattern continuously, such that after one packet ends the same packet is sent again. By implementing CSTs for area-blanketing, entrance and exit, using the same microcontroller, a single device, suitably configured, can be used for each use. Indeed, a device first configured for an entrance can later be configured for an exit when an event is over.

A preferred embodiment design of a receiver and its connections to restricted device 101 is shown in FIG. 6. Microcontroller 140 may be an inexpensive low-power microcontroller such as the aforementioned Motorola MMC2001. Signal output of ultrasonic transducer 141 is amplified, filtered, and detected by analog hardware 142 which sends a digital signal to serial input port RxD0, 143. When a 40 KHz ultrasonic wave is detected by transducer 141 analog hardware 142 outputs a low digital signal. Parallel port EPDR bit 0 (144) outputs a signal which is applied to the cellular telephone's sound generating or reproducing module 101 to mute it; when this signal is high, sound output is muted. Unfortunately, a restricted device may completely be turned off when it is passed through an entrance or an exit, thereby making it unable to receive and process entrance and exit packets. However, microcontrollers such as the Motorola MMC2001 have low-power stop and doze modes, whereby the microcontroller, though turned off to conserve battery power, can be put in the run mode upon receipt of a signal such as the output of analog hardware 142. The microcontroller would be maintained in a stop or doze mode. Then it can be put into a run mode upon receipt of a signal from analog hardware 142 to respond to entrance and exit packets.

C language procedures for the receiver are shown in FIG. 8. Procedure init 150 is executed just after the microcontroller is reset, to configure the I/O devices. Line 151, and the following four lines, initialize UART0 for 600 baud reception of 8-bit data packets with no parity and one stop bit (assuming the MMC2001 has a 32 MHz clock rate). Line 152 initializes the edge port to output a muting signal on edge port bit 0. Procedure check( ) 153 is executed slightly less often than every 15th of a second. UART packets that arrive in the meantime are stored in a hardware queue; each packet's data is read from this queue by reading a byte from port U0TX. Line 154 checks for the presence of a packet's data in the hardware queue. As long as there is data in the queue, line 155 reads the data. If the packet was received in error, nothing is done (line 155), otherwise if the area blanketing packet 0x8d is received, local variable i is set equal to 1 (line 156) to mute the electronic device, otherwise if the entrance packet 0xae is received, global variable timeout is set equal to constant N (157) to mute the electronic device for the next three hours, otherwise if the exit packet 0xe6 is received, global variable timeout is cleared (line 158) to restore the electronic device to its non-muted state. If timeout is nonzero, local variable i is set to 1 (line 160) to mute the electronic device. Local variable i is output into port EPDR, where a value of 1 mutes the restricted device (line 161). The variable timeout is periodically decremented. (The program segment for this periodic decrement function is not shown, there being several ways to do this, which are not important to this invention.) The value N (159) is selected such that, unless timeout is prematurely cleared, timeout will become zero in a predetermined time, which is three hours in this preferred embodiment. Thus, if any packet is received without error, having a pattern 0x8d that is sent by area-blanketing CST 100, the mute signal is asserted and the objectionable audio signal is not produced, and if any packet is received without error, having entrance pattern 0xae sent by CST 105, the mute signal is asserted and the objectionable audio signal is not produced for the next three hours, or until exit pattern 0xe6 is received.

Occasionally a need may arise to override the automatic mute control, for instance to permit an emergency telephone signal to ring the cellular telephone even though it is muted, or for instance to restore a device that is accidentally muted. However, overriding should not be so easy as to defeat the objective of this invention. A command should be able to be sent from a controlled source, such as a service department's telephone hot line, to override the mute control. Request authorization to override the muting capability should be administered by the service department so as to prevent users from flagrantly restricting the muting capability, yet handle valid exceptions to automatic control. A communication channel will send the command from the service center to the electronic device. In this preferred embodiment, a command may be sent on a cellular telephone channel. This message can be carried by a signal that is modulated using frequency-shift keying, which is also used in modems and faxes. The signal will be modulated using a UART packet structure, for reasons discussed earlier in this specification. Hardware and software for this preferred embodiment is similar to that for receiving control signals in a restricted device, as in FIG. 8. whereas the control signal receiver user UART device numbered zero, there is a second UART device, numbered one, with the same functionality as UART device numbered zero, that can be coupled through a modem device of known design to the cellular telephone's audio channel. So, in the interests of brevity, this hardware and software will not be further described in this specification. In order to make unauthorized generation or duplication of these commands somewhat more difficult, using larger messages than discussed earlier, the electronic device's telephone number and the current time will be sent in the commands, to prevent one command from restricting many devices or from being repeatedly used to restrict the same device (the time sent in the command can be compared to the current time, which is maintained in most cellular telephones). At least a simple encryption technique will be used to make construction of these messages more difficult, such as appending a check sum to the end of the message which is the sum of all the bytes in the message. This can be used to foil counterfeiters of commands who are unskilled in the art of communication protocols. However, without departing from the spirit of this invention, any communication channel such as a regular telephone line or a pager channel can be used; the command may be sent on different carriers than frequency-shift keying, such as amplitude modulation; the command may be modulated using different communication packet structures; the command may be composed using different packet sequences; and the command may be secured using more powerful encryption techniques.

Two mechanisms may be used to restrict the use of controllers. In a first mechanism, a command may likewise be able to be sent from a controlled source, such as a service department's telephone hot line, through a communication channel to enable and configure a CST. Authorization to enable and configure a controller should be administered by the service department so as to limit the risk that a controller apparatus might be used mischievously or maliciously. In this preferred embodiment, a command may be sent on a telephone channel, carried by a signal that is modulated using frequency-shift keying, modulated using a UART packet structure, for reasons discussed earlier in this specification. Again, hardware and software for this preferred embodiment is similar to that for receiving control signals in a restricted device, as in FIG. 8. So, in the interests of brevity, it will not be further described in this specification. The command will contain a signal byte which will be transmitted by the CST receiving the command. In order to make unauthorized generation or duplication of these commands a bit harder, the CST should have a unique computer-readable serial number; the command will have this serial number and the current time, to prevent one command from being used to enable and configure other unauthorized CSTs or from being repeatedly used to enable the same CST, because the time can be compared to the current time that can be maintained in the CST. At least a simple encryption technique will be used to make construction of these commands more difficult, such as appending a check sum to the end of the message which is the sum of all the bytes in the message. This can be used to foil counterfeiters of commands who are unskilled in the art of communication protocols. However, without departing from the spirit of this invention, any communication channel such as a cellular telephone line or a pager channel can be used; the command may be sent on different carriers than frequency-shift keying, such as amplitude modulation; the command may be modulated using different communication packet structures; the command may be composed using different sequences of packets, such as containing a range of serial numbers and a range of times, instead of a single serial number and a single time for which a command is valid; and the command may be secured using more powerful encryption techniques.

Alternatively, in a second mechanism, the controller can be enabled and configured by plugging into it a small cartridge, containing a removable non-volatile memory such as an electrically erasable programmable read-only memory (EEPROM). Such a cartridge is similar to ROM cartridges once commonly used to load games into personal computers or game players, and is similar to a "smart card" or magnetically recorded credit card. The techniques for programming such a non-volatile memory, and for connecting such a non-volatile memory to a controller, are well-known to one skilled in the art. In this alternative preferred embodiment, a service department will write the EEPROM and mail it to the controller's user. Authorization to enable and configure a controller should be administered by the service department so as to limit the risk that a controller apparatus might be used mischievously or maliciously. The EEPROM will be read by the controller to enable and configure its control signals. In order to make unauthorized generation or duplication of these commands a bit harder, the controller should have a unique computer-readable serial number; the EEPROM will store this serial number and the current time, to prevent one EEPROM from being used to enable and configure other unauthorized controllers or from being repeatedly used to enable the same controller, because the time can be compared to the current time that can be maintained in the controller. At least a simple encryption technique will be used to make construction of these EEPROMs more difficult, such as appending a check sum to the end of the message which is the sum of all the bytes in the message. This can be used to foil counterfeiters of commands who are unskilled in the art of construction of data records. However, without departing from the spirit of this invention, a read-only memory (ROM), a magnetic stripe, or alternative nonvolatile memory may be used in place of an EEPROM, the format of data in the card might be modified to contain, for instance, a series of dates and a range of serial numbers, for which authorization is given, and a more elaborate encryption code can be used.

The following discussion refers to FIG. 9. In a second preferred embodiment of this invention, an information packet 180 is sent from the CST to the cellular telephone and is stored therein. It is augmented from the first embodiment's 8 bit packet pattern, to say up to 16 bits of enable/restrict information 181, 3-byte time duration 183, hash-coded time-of-day 184, 12-digit BCD, 6-byte telephone number 185, 2-byte message 186, followed by an optional 2-byte parity 187, which can be the exclusive-OR of each of the other 16-bit rows of the packet. The parity can be omitted from the packet if the communication channel already has error detection capability. The 16 bit enable/restrict field is broken down into 1-bit fields that each enable (if 1) or restrict (if 0) a specific capability. For instance, the least significant bit 182 enables or disables the ringer from ringing. Using these additional bits, more operations can be disabled, some operations can be enabled or caused to be executed, and some operations can be more effectively done than the original 8-bit packet has room for. In the remainder of this specification, the following terms help to concisely describe its preferred embodiment. A Touch-Packet Interface (TFI) is a microcontroller and LCD interface described in a co-pending patent application having Ser. No. 11/725,212, filed Mar. 16, 2007, which is particularly suited to this application, and which is therefore incorporated herein by reference. It is basically the same as the controller in the first embodiment. A zone is a contiguous inhabitable area, such as an auditorium, having the same state, this state being a set of enables and message and telephone number digits. A zone is a generalization of the first preferred embodiment's restricted area. The client is a person with a cellular telephone, and the administrator is a person who is authorized by the owner of the zone to set the state, which defines the conditions of use of the cellular telephones in the zone. A client's cellular telephone is zone-aware if it responds to the administrator's chosen state in the manner set forth in this specification. The following text first outlines the capabilities, which are discussed in more detail following this overview.

Using this second preferred embodiment, this inventive system can inhibit various operations that are normally permitted when using a cellular telephone. The control signal can direct the cellular telephone to prevent it from ringing, or to replace a ringing operation with a vibrating operation. It can prevent radio frequency signals from being emitted, which are normally used to carry voice or data to the cellular network. It can prevent the outputting of voice, audio or text data from the cellular telephone, or turn off (mute) the microphone or mouthpiece audio input. In a cellular telephone that is equipped with a camera, it can turn off the camera. It can inhibit the generation of, or sending of text messages and still or video pictures. It can prevent any more than three digits to be dialed for the telephone number being called.

Using this second preferred embodiment, this inventive system can enable or execute various operations that are not normally provided to cellular telephone clients. It can cause the cellular telephone to transmit a low-power radio frequency signal that can be detected by law enforcement personnel. And this inventive system's CST can cause a zone-aware cellular telephone to send a 2-byte message to a 12-digit telephone number, and then interact with the dialed telephone.

The latter operation can be used in several applications. The message and telephone number can be used to identify cellular telephones in zones around high-value targets. It can further be used to send emergency messages to instruct clients on what to do or where to go. It can also be used to send a video to the cellular telephone over the cellular telephone channel, for a real-estate agent to show the interior of houses on the market to a client. It can also be used can be used to send a video over the cellular telephone communication channel to further describe a billboard's advertisement. The dialed digits can be used to provide a user's pin number, a number like a catalog's part number, and a quantity number to purchase goods or services, or as a key command to unlock doors, or turn on lights or appliances in a household. Finally, it can cause a cellular telephone, whose battery is not charged or being charged, and which is located close to its charger, to emit a sound that the user responds to by putting the cellular telephone into its cradle, to charge its battery.

This inventive system can send the command "enable if closer" from one CST to counter a command that is sent from another CST that is not sending this "enable if closer" command, cancelling the command that the latter controller sends.

Finally, each of these commands is sent from the controller with a timeout, in seconds. After this timeout, the command is cancelled, permitting the cellular telephone to operate normally.

These capabilities and their enabling and restricting mechanisms are detailed below.

In this preferred embodiment, a TFI is used to provide a concrete environment that illustrates the input and use of the state variables in the CST and cellular telephone. The low-level input-output of this second preferred embodiment can be similar to the low-level input-output of the first preferred embodiment, so a description of the low-level input-output mechanism will be omitted here in the interest of brevity. Despite the following description of the details about the higher-level interface discussed below, or the low-level input-output discussed earlier in this specification, the use of another interface can be used in place of this TFI without departing from the spirit of this invention.

Figure 10:
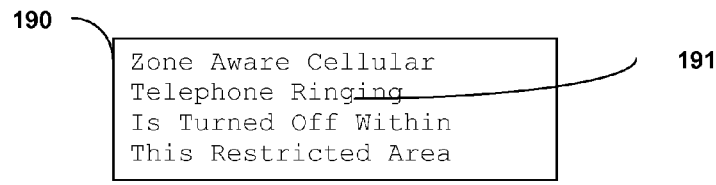
FIG. 10 is a screen display to a client of the state of the system that shows that zone-aware cellular telephones will inhibit ringing in the zone.

In this TFI, a client sees an LCD display screen 190 in FIG. 10 displays the state of the zone, and little else. This screen 190 would be displayed if ringing were inhibited. Similar screens are displayed for different capabilities, replacing "ringing" 191 with the name of the capability that is inhibited. If several capabilities are inhibited at the same time, a continuous cycle of screens displays each capability that has been disabled, one such disabled capability per screen.

Figure 11:
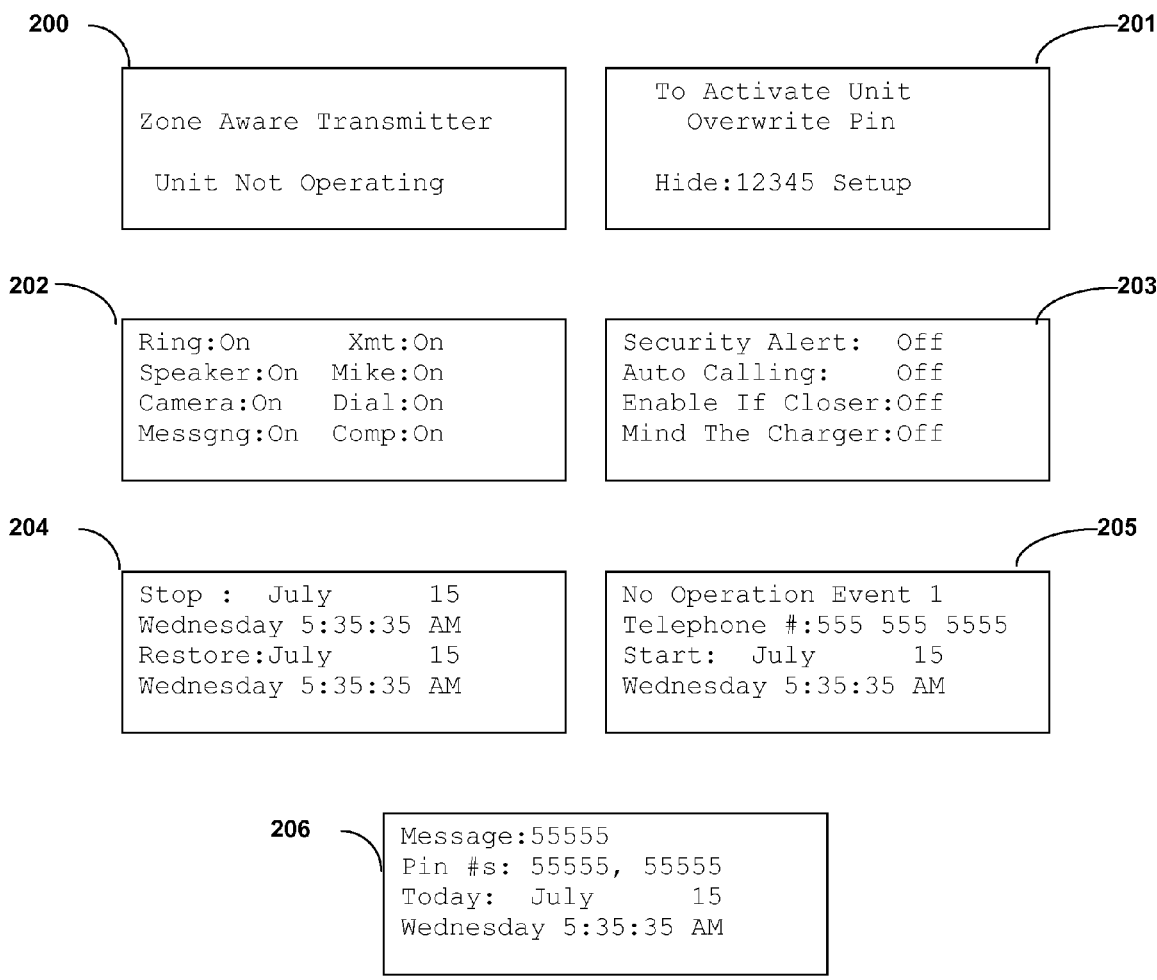
FIG. 11 is a collection of screens displayed to an administrator that facilitate the latter's managing the system.

An administrator, having a password or PIN number, uses it to access the state that is to be used in the zone using the TFI, as illustrated in FIG. 11. "Initial Screen After Reset" 200, is displayed when power is first turned on. "PIN Selection" 201 is used to enter a personal identification number (PIN). Only when a correct PIN is entered are the remaining screens accessible: "Restricting Screen" 202, "Enabling Screen" 203, "Stop Screen" 204, "Operational-Start Screen" 205, "Message-Time-Pin Screen" 206. The cursor can be moved to any of these screens. When the cursor is on a screen, that screen is displayed on the LCD display. The cursor can then be moved over the state variable that is to be changed, and keys can be pressed to select which state values will be sent from the control signal to the cellular telephones in the zone. The administrator can thus determine the state to be sent to the cellular telephones.

Figure 12:
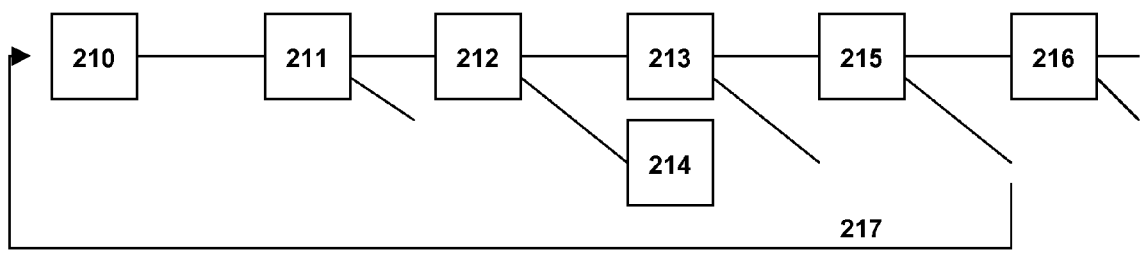
FIG. 12 is a tree graph of electrical connections among control signal transmitters.

FIG. 12 illustrates the electrical connection of a TFI and CSTs that are placed inside a zone to support a physical layout of CSTs such as is shown in FIG. 3. The following discussion illustrates how the packets can be synchronized so that no two neighboring nodes in the layout 103 transmit their ultrasonic packets at the same time. TFI 210 is shown as a root node of a binary tree graph, where each node CST 211, ..., 216 has an input connection shown on its left, and has output connections to up to two descendants shown to the right of the aforementioned node, lines (except 217) indicating electrical connections conveying data from left to right. Line 217 represents an electrical connection in which data passes towards the root of the tree. Note that not all outputs need be connected; for instance while node 212 is connected to two descendent to its right, node 211 has only one descendent and node 216 has no descendent. Each node is numbered as the number of nodes between it and the root, modulo 4 (this modulo is chosen for the physical layout shown in FIG. 3). For instance, node 210 is numbered 0, node 211 is numbered 1, node 212 is numbered 2, and 213 and 214 are numbered 3, node 215 is numbered 0, and node 216 is numbered 1.

In FIG. 12, TFI 210 sends out the information packet 180 as the administrator configures it. This packet 180 is sent out to each of its descendents 211 over a time interval from t0 to t1 seconds, during an elapsed time t seconds. After the entire packet of information has been received in descendent 211, the latter begins to send its information packet to its descendent 212 over a time interval from t1 to t2 seconds, during the same elapsed time t. After the entire packet has been received by descendent 212, it outputs the packet simultaneously to its two descendents 213 and 214 over a time interval from t2 to t3 seconds, during the same elapsed time t. Similarly, CSTs 213 and 215 send their information packet to their descendents, and 214 and 216 also sends its packet, but no CST receives this packet. While node 215 is sending its packet, root node 210 will send out a packet. As a CST, such as 211, sends its packet as discussed above, it also transmits the same packet over the signal to cellular telephones in the zone. Generally, all nodes with the same aforementioned number will send out their packets at the same time, and because root node 210 sends out its packet every fourth time interval t, no two CSTs having different numbers will emit their ultrasonically transmitted packets at the same time. Finally, each node transmits its ultrasonic packet right after it has received and sent out its packet thought the connections shown in FIG. 12. Referring to FIG. 3, all nodes in even numbered rows and even numbered columns will be electrically connected as nodes numbered 0 in FIG. 12, all even-numbered-row, odd-numbered-column nodes in will be numbered 1, all odd-numbered-row, even-numbered-column nodes will be numbered 2, and all odd-numbered-row, odd-numbered-column nodes will be numbered 3. In this manner, no two neighbors in the mesh (FIG. 3) will transmit their ultrasonic packet at the same time. In order to save and simplify wiring, a dummy node can be put in the tree that operates like a CST to send the packet to its descendents after delaying it one time period t, but does not itself send out an ultrasonic signal. One or more dummy nodes can be used to force the assignment of a desired number to a given node.

As a packet is sent from TFI 210 though CST modules, such as 211, to cellular telephone 101, incoming packets are stored in an input buffer, and outgoing packets are stored in a different output buffer. When incoming packet is completely received, parity 187 can be checked, or the communication channel's error detection capability can be checked; the packet being moved from input to output buffer only if no errors are detected. Note that if a packet with error is received, the previously received errorless packet is sent in place of the erroneous packet.

FIG. 12 further shows a more secure system utilizing the binary tree connection. Since TFI 210 must be accessible to the administrator, and its display should also be viewable by clients, it might be hung on a wall or placed on a table top, so it could be difficult to secure, and thus be easy to steal. The thief could use it to override properly authorized and implemented systems. However, CSTs 211, 212, ..., 216 can be much more securely fastened, say into a ceiling or a door frame, and can be much less accessible than TFI 210. Each CST, 211 through 216, can have two unique three-byte id numbers stored in it, referred to as the incoming id and the outgoing id. A farthest descendent node like 216 is selected, and a circular path, from the TFI through it back to the TFI, is thereby determined. These pair of id numbers of each of the CSTs in the circular path can be stored in the TFI's aforementioned removable EEPROM. TFI 210 could automatically send each of these incoming id numbers through the circular path connections, right after the TFI has been powered up or reset. To avoid appearing as packets transmitting the zone's state to cellular telephones, a packet containing these id numbers is sent whose bit vector 181 has all "1" bits, and will send up to four 3-byte id numbers in the remainder of the packet. As this packet passes through a CSI, if any of its ids matches the CST's incoming id in it, this id is replaced with the CSI's outgoing id. At the TFI, if any returned id is not an outgoing id, then some CSI's incoming id failed to match its incoming id so as to be replaced with a CSI's outgoing id, so the TFI would stop functioning. Thus, in order to use a stolen TFI, a thief would also need to steal all the CSTs in the circular path through the binary tree that leads though the return line 217 back to TFI 210.

Figure 13:
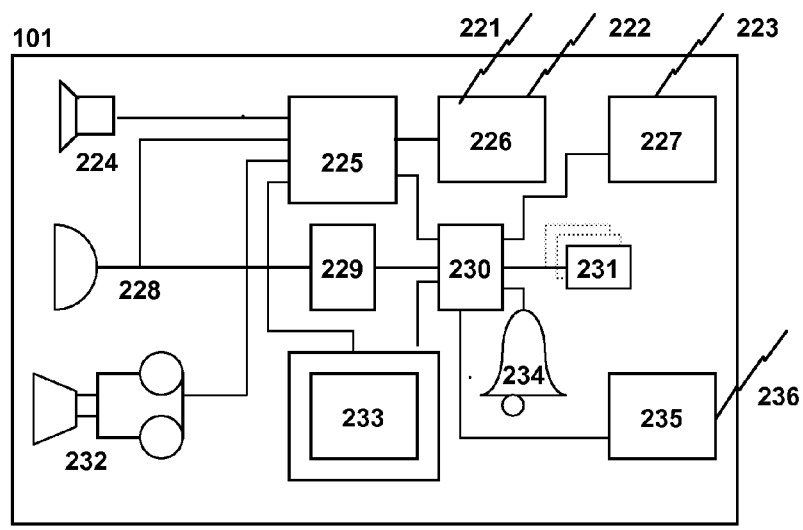
FIG. 13 is modular description of a generic cellular telephone that illustrates where control is carried out for the various commands discussed in this invention.

FIG. 13 illustrates the organization of a generic cellular telephone 101. A speaker or earpiece 224 is coupled to an analog signal circuit 225, which provides power to drive the speaker or earpiece 224 from the digital transceiver 226, which gets its signal from radio frequency receiver antenna 221. The microphone or mouthpiece 228 sends an audio signal to analog signal circuit 225, which is coupled to the digital transceiver 226 to transmit the radio frequency signal through antenna 222. Optionally, digital camera 232 can send video signals to analog signal circuit 225, which can be stored therein, send them to microcontroller 230 to be stored therein, or send them though transceiver 226 to output antenna 222. Analog signal circuit 225 or microcontroller 230 can output video information to LCD display screen 233. Ultrasonic control signals can be received from microphone 228 and passed through ultrasonic amplifier, filter, and detector 229 to microcontroller with keyboard 230, or optionally, low-power radio-frequency antenna 236 can supply control signals through receiver 235 to provide control signals which are analyzed by microcontroller 230. Further microcontroller 230 is coupled to ringer 234 or optionally, to vibrator 231. Optional low-power radio-frequency transmitter 227 can drive antenna 223 to alert law enforcement personnel to the presence of a cellular telephone and assist them in locating the cellular telephone.

When the command "ringing off" is sent to the cellular telephone and displayed in the CST sequence of screens, a cellular telephone will not ring. This is caused by the administrator changing screen 202's top line from "Ring:On" to Ring:Off". It is communicated in the packet 180 sent to the cellular telephone by clearing bit 182. Upon receipt of such a packet, the cellular telephone will open the connection from microcontroller 230 to ringer 234, or achieve the same outcome as opening the aforementioned connection.

When the command "vibrate instead of ring" is sent to the cellular telephone and displayed in the sequence of screens, then the cellular telephone will vibrate instead of ring when a call is placed to it. This is caused by the administrator changing screen 202's top line from "Ring:On" to Ring:Vibrate". It is communicated in the packet 180 sent to the cellular telephone by clearing another bit in the enable/restrict bit vector 181, like the previous paragraph showed how the ringer enable bit 183 was used. Upon receipt of such a packet, the cellular telephone opens the connection from microcontroller 230 to ringer 234, while closing the connection from microcontroller 230 to vibrator 231, or by causing the same outcome as changing the aforementioned connections.

Restricting ringing, or replacing ringing with vibrating, should help clients who forget that their cellular telephones are not turned off. It is expected to be useful in concert halls, houses of worship, classrooms, and many businesses that currently have signs posted to request that the client turn off his or her cellular telephone. Other devices such as pagers could also receive and obey the above commands that are given to cellular telephones.

When the command "transmission off" is sent to the cellular telephone, then the cellular telephone will not send radio frequency signals carrying voice or data to the cellular network. This is caused by the administrator changing screen 202's top line from "Xmt:On" to Xmt:Off". It is communicated in the packet 180 sent to the cellular telephone by clearing another bit of bit vector 181. Upon receipt of such a packet, the cellular telephone opens the connection from analog circuit 225 to transceiver 226 for outgoing signals, or by causing the same outcome as opening the aforementioned connection.

This command "transmission off" is intended for emergency situations such as occurred at the World Trade Center on Sep. 11, 2001, or when the Minneapolis Minn. bridge collapsed earlier this summer. During these emergencies the cellular telephone system was overwhelmed and emergency calls could not get through. This command would prevent most cellular telephone calls from using any cellular telephone system resources, so that emergency personnel could use these resources without them being saturated by less important calls.

When the command "speaker off" is sent to the cellular telephone, the cellular telephone will not output voice or audio data from the cellular telephone to the client. This is caused by the administrator changing screen 202's second line from "Speaker:On" to Speaker:Off". It is communicated in the packet 180 sent to the cellular telephone by clearing another bit of bit vector 181. Upon receipt of such a packet, the cellular telephone opens the connection from analog circuit 225 to speaker 224, or causes the same outcome as opening the aforementioned connection.

This command is intended for situations similar to those in which ringing is disabled. It can be used in automobiles if the driver is willing to allow its use. The driver might be willing to use this mode as a result of law enforcement, for instance as a court judgment passed on for individuals who had an accident while using the cellular telephone, or by insurance companies that offer discounts to individuals who have the controller with this command enabled in all automobiles that are covered by the insurance policy, and in all cellular telephones that the insured person uses. Moreover, either ringing or an audio tone through a speaker or earphone can be used to trigger a bomb. Near high-value targets, both ringing and speaker might be turned off to prevent some uses of cellular telephones that have been used to explode bombs.

When the command "microphone off" is sent to the cellular telephone, then the cellular telephone will turn off (mute) the microphone or mouthpiece audio input. This is caused by the administrator changing screen 202's second line from "Mike: On" to Mike:Off". It is communicated in the packet 180 sent to the cellular telephone by clearing another bit of bit vector 181. Upon receipt of such a packet, the cellular telephone opens the connection from audio processor 225 to microphone 228, or causes the same outcome as opening the aforementioned connection.

This command is intended for lectures or musical events in which the lecturer or performer does not want the lecture or performance to be heard by individuals not authorized to hear, or not paying for, the lecture or performance.

When the command "camera off" is sent to the cellular telephone, then the cellular telephone will turn off the camera in the cellular telephone. This is caused by the administrator changing screen 202's third line from "Camera:On" to Camera:Off". It is communicated in the packet 180 sent to the cellular telephone by clearing another bit of bit vector 181. Upon receipt of such a packet, the cellular telephone opens the connection from video or still picture camera 232 to analog processor 225, or causes the same outcome as opening the aforementioned connection.

This command is intended for places that cellular telephones could be used to view illicit or improper scenes, such as dressing rooms, bathroom facilities, and the like. It would protect persons using these facilities from being viewed by clients that wish to use cellular telephones for such improper purposes. Other devices such as digital and video cameras could also receive and obey this command given to cellular telephones.

When the command "messaging off" is sent to the cellular telephone, then the cellular telephone will turn off receiving text messages. This is caused by the administrator changing screen 202's bottom line from "Messgng:On" to Messgng: Off". It is communicated in the packet 180 sent to the cellular telephone by clearing another bit of bit vector 181. Upon receipt of such a packet, the cellular telephone opens the connection from microcontroller 230 to display 233 for messages or video display, or causes the same outcome as opening the aforementioned connection.

This command is intended for use in classrooms, especially during exams, where cellular telephone messaging is contra productive to the school environment. It might also be appropriate for use in automobiles.

When the command "dialing off" is sent to the cellular telephone, then the cellular telephone will allow a three-digit dialing to occur, but will prevent any more than three digits to be selected for the telephone number being called. Dialing three digits would permit an emergency 911 call to be placed, or a speed-dialed number to be placed, but would prevent dialing seven or ten digits. This is caused by the administrator changing screen 202's third line from "Dial:On" to "Dial: Off". It is communicated in the packet 180 sent to the cellular telephone by clearing another bit of bit vector 181. Upon receipt of such a packet, the cellular telephone causes microcontroller to count the number of key strokes on a keyboard incorporated in the aforementioned microcontroller, and prevent more than three such keys to be recognized, or by causing the same outcome as the aforementioned activity causes.

This command is intended for use in automobiles where cellular telephone dialing is responsible for many accidents. The CST can be coupled to a speed sensor so that dialing is not inhibited if the automobile is stationary, but is inhibited when the automobile is in motion. Clients could be induced to use this mode through legal judgments or insurance discounts, as was suggested earlier with regard to a "speaker off" command.

When the command "computation off" is sent to the cellular telephone, then the cellular telephone computer would be put in a sleep mode. This is caused by the administrator changing screen 202's bottom line from "Comp:On" to Comp:Off". It is communicated in the packet 180 sent to the cellular telephone by clearing another bit of bit vector 181. Upon receipt of such a packet, the cellular telephone turns off, or puts to sleep, its microcontroller 230, or causes the same outcome as the aforementioned activity causes.

This command might be useful in airplanes where all passengers are requested to turn off cellular telephones and computers so as to not interfere with the airplane navigational electronics by generating noise from their cellular telephones or computers. Other devices such as pagers could also receive and obey the commands given to cellular telephones.

When the command "security alert on" is sent to the cellular telephone, then the cellular telephone computer would transmit a low-power radio frequency signal that can be detected by law enforcement personnel.

This is caused by the administrator changing screen 203's top line from "Security Alert:Off" to Security Alert On". It is communicated in the packet 180 sent to the cellular telephone by setting another bit of bit vector 181, which was initially cleared. Upon receipt of such a packet, the cellular telephone sends a command from microcontroller 230 to low-power radio-frequency transmitter 227, to radiate from antenna 223 a signal detectable by law-enforcement personnel and useable to direct them to find the aforementioned cellular telephones.

This command might be useful in finding cellular telephones hidden in high-value target areas. Law-enforcement personnel could use a simple radio-frequency signal strength meter to detect the presence of a zone-aware cellular telephone, and could use a direction-finder to locate the aforementioned cellular telephone. The low-power radio frequency signal would normally not be transmitted, to save power, but would then be transmitted in areas where there is reason to believe that a cellular telephone might be used to detonate a bomb. This technique of transmitting the low-power radio frequency signal from antenna 223 appears to have been previously disclosed and be already known. By only sending this command in areas where a cellular telephone could be used to detonate a bomb, this system would save power for other situations where there is no need to locate possibly hidden cellular telephones.

When the command to force "auto calling" is sent to the cellular telephone, then the CST sends a 2-byte message to a 12-digit telephone number. This is caused by the administrator changing screen 203's second line from "Auto Calling: Off" to "Auto Calling:On!", putting the desired message in the top line of screen 206, and putting the desired telephone number in the second line of screen 205. It is communicated in the packet 180 sent to the cellular telephone by setting another bit of bit vector 181, putting the desired message from the top line of screen 20 into packet 180's message field 186, and putting the desired telephone number from the second line of screen 205 into packet 180's telephone number field 185. Upon receipt of such a packet, the client's cellular telephone dials the number thus sent, and sends the message to the dialed telephone. The dialed telephone can communicate with the client's cellular telephone until either telephones hang up.

The dialed telephone can send a text message to the client's cellular telephone that has characters, digits, spaces, or under-bars (_), to be displayed on the client's cellular telephone's LCD display. If there are underbars (_) in the text message, for each under-bar, the client's cellular telephone is expected to send a digit, the first digit being pressed replacing the first (leftmost) under-bar, the second digit being pressed replacing the second (second from leftmost) under-bar, etc. until all underbars have been replaced by client-supplied digits. The digits will be sent when all under-bar characters are replaced by digits punched in by the client. The "*" key is to be used for backspacing the digits in the text message and the "#" key is to be used to cancel the sending of digits. Other than that specified above in this paragraph, the message may have any interpretation and format, as determined for the telephone whose telephone number is supplied in the packet.

The forced "auto calling" message can be used to identify the client at entrances to or within a zone encompassing a high-value terrorist target. As each cellular telephone enters a zone, it could dial the telephone number provided by the message sent to it. The dialed telephone, having also obtained the telephone number of the client's telephone as generally happens now when a call is made, like in "caller id", the client's telephone number could be recorded, or searched among a list of suspicious or dangerous users, to alert law enforcement personnel about the possibility of the cellular telephone being used to explode a bomb, or exercise command and control over a group of terrorists.

A use of forced "auto calling" would permit emergency messages to be brought to the attention of persons that need to hear the messages and respond to the message. In the recent Virginia Tech massacre, the university officials attempted to send emails to alert the students to keep away from the classroom where the gunman was killing people. Unfortunately the students were already on their way to class, and did not have their computers on to receive the emergency email. Using our device, an ultrasonic or low-power radio frequency control signal would be transmitted in locations where clients might be, which would alert the client about the emergency. The cellular telephone would automatically dial the number of a send-only telephone which many users could listen to simultaneously without interfering with each other. The audio or video signal sent to the client would give local instructions on what to do or where to go. This inventive system would have saved many lives. It could be used in the future to disseminate localized emergency information.

When the command optional "auto calling" is sent to the cellular telephone, then the CST may send a 2-byte message to a 12-digit telephone number. This is caused by the administrator changing screen 203's second line from "Auto Calling:Off" to "Auto Calling:On?", putting the desired message in the top line of screen 206, and putting the desired telephone number in the second line of screen 205, almost exactly as forced "auto calling" is initiated. It is communicated in the packet 180 sent to the cellular telephone by setting another bit of bit vector 181, and putting the desired message from the top line of screen 206 into packet 180's message field 186, and putting the desired telephone number from the second line of screen 205 into packet 180's telephone number field 185, as was done for forced "auto calling". Upon receipt of such a packet, the client's cellular telephone indicates the availability of an "auto call" packet by displaying a symbol on the client's LCD, like the symbol used in currently used cellular telephones indicating that a text message has been received. The client may then press the key to complete transmission of the packet. The message is sent to the telephone which has the telephone number that was sent in the packet, as was done for forced "auto calling". The difference between forced and optional "auto calling" is that the former is treated like an incoming call that generally should be answered, whereas the latter is like an invitation to initiate a call to the telephone whose telephone number is in the message, which can be ignored without disturbing the client or other personnel in the zone.

If there are underbars (_) in the text message sent by the dialed telephone, the client is expected to press digits on his or her cellular telephone, the first digit being pressed replacing the first (leftmost) under-bar, the second number being pressed replacing the second (second from leftmost) under-bar, etc. in the same manner as text coming from the dialed telephone is interpreted for forced "auto calling". Other than that specified above, the message may have any interpretation and format, as determined for the telephone whose telephone number is supplied.

Optional auto calling could be used by real estate agents putting such a CST that transmits the telephone number and message to send a video to the cellular telephone over the cellular telephone channel, to show the interior of houses on the market. As a client drives to a house that has a CST, there being some visual indication of the presence of the CST, this application lets him or her automatically dial the real estate agent who will send pictorial or other information about the house that the administrator sets up. This application can be similarly used in marketing. A CST near a billboard, there being some visual indication of the presence of the CST, might let clients send a message to the telephone number that sends audio-video descriptions to the client's cellular telephone. This technique using visual bar codes in place of the ultraviolet or low frequency radio frequency signals, is evidently in wide use right now in Asia.

The use of a pin number could be sent to a house with a computer that receives the messages, and the selection number can be used to unlock doors, turn on lights or appliances. As the client approaches a door with the controller sending the auto calling message, the message can be used to implement some security functions to prevent break-in or malicious operations.

The use of this device to open locks differs significantly from the popular on-star device for opening doors. The text message sent to the client's cellular telephone from the dialed telephone can have some of the numbers, needed in the message sent by the cellular telephone to the computer, filled in automatically so the client doesn't need to enter them. The computer that receives the messages can be coupled to the TFI to provide different codes for the message sent by the cellular telephone to unlock the doors or turn on the lights, including some of the numbers needed in the message sent by the cellular telephone to the computer. The local signal, sent over the ultrasonic or low-power radio frequency channel, makes this device able to implement an electronic lock-and-key that does not require human intervention to provide adequate protection against unauthorized use, as the popular on-star device requires. This device is suited to every-day use rather than for emergency use, as on-star is suited for.

A similar use of auto calling would permit a client in a grocery store to press the cellular telephone next to a CST located next to an item for sale, to purchase it. The cellular telephone could also indicate the total price of goods purchased up until now, and even charge the client for the item, so as to avoid the need for the client to go through a checkout counter.

When the command "enable if closer" is sent by the CST in addition to other commands as discussed above, it counters the other commands. It is communicated in the packet 180 sent to the cellular telephone by setting another bit of bit vector 181 and putting the desired message into packet 180's message field 186. The microcontroller 230 would be programmed to carry out this operation. For instance, the commands "speaker off" and "enable if closer" are simultaneously sent from a first CST, but "speaker off" is sent from a second CST while the command "enable if closer" is not sent from it, if the cellular telephone determines that the first CST is nearer the cellular telephone, it cancels the "speaker off" command, but if the cellular telephone determines that the second CST is nearer the cellular telephone, it continues to enforce the "speaker off" command.

The command "enable if closer" that permits overriding other commands is useful for zones that have specific entrances and exits, in which all who enter the zone will enter through an entrance and exit through an exit, no entrance being also an exit. The CST at the entrance can transmit commands to prevent ringing, talking, or whatever, and the CST at the exit can override the commands given by the CST at the entrance.

Figure 14:
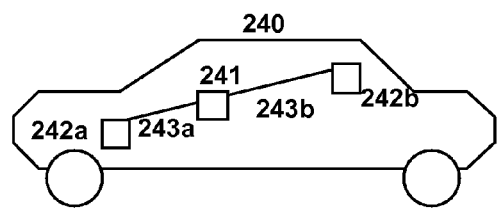
FIG. 14 is a side-view of an automobile that illustrates how the "enable if closer" command is carried out in it.

This same command can be used in an automobile, to inhibit only the driver's cellular telephone without inhibiting any passenger's use of cellular telephones. See FIG. 14. An automobile 240 has a CST 242a, near the driver, that inhibits certain uses of the cellular telephone such as dialing more than 3 digits. This automobile 240 also has a CST 242b located opposite to the driver, that sends a command "enable if closer" that cancels the command that inhibits dialing more than 3 digits, thereby enabling dialing of more than three digits. If the CSTs 242a and 242b are synchronized, for instance by providing both with the same timing clock, but one, for instance 242a, transmitting on the even numbered clock pulses, while the other, for instance 242b, transmitting on the odd numbered clock pulses, then by observing the time from when 224a's signal arrives at the client 241 through path 223a, and 242b's signal arrives at the client 241 through path 223b, the client's cellular telephone can determine if it is closer to 224a or to 224b by measuring the time delay from the beginning of the first packet to the beginning of the second packet, and the time delay from the beginning of the second packet to the beginning of the first packet. If the client 241 is positioned nearer to the CST 224b, sending the code to "enable if closer", than it is to CST 242a that is sending the code to restrict dialing more than three digits, the cellular telephone would not be prevented from dialing more than three digits. A client in the back seat or the passenger seat could be able to use cellular telephone, while the driver is prevented from using it.

The "enable if closer" command used for exits in zones that have specific entrances and exits will be carried out in the same manner the same command used in an automobile using a clock for synchronization. The "enable if closer" command should be honored when exiting the zone, even if the command to restrict some capability at the entrance is also received by the client's cellular telephone. Since the "enable if closer" command is received within less time from the last command to restrict some capability than the other time from the last command to restrict some capability to when the "enable if closer" command is received.

Generally, the packet for the "enable if closer" command differs only from the command that it overrides in one bit condition. Therefore, the same TFI 210 can be used to generate both the overridden command and the "enable if closer" command, the overridden command being sent all throughout the binary tree in FIG. 12, but only certain CSTs such as 215 would change the aforementioned bit, sending out a "enable if closer" command, rather than overridden command, on the ultrasonic signal transmitted from it. One or more CSTs such as 215 sending out a "enable if closer" command could be in a system, wherever the sending out a "enable if closer" command should be transmitted.

The command "enable if closer" is potentially dangerous. A client could make, purchase or steal a device that duplicates a properly implemented controller that executes an "enable if closer" command, thereby defeating any system that is designed according to this invention. In order to prevent a client from doing this, the state's 12-digit message is sent from TFI 210 as discussed previously, and sent through certain CSTs such as 215 that output an "enable if closer" command. The command "enable if closer" would only be honored in a cellular telephone for commands that send the same message as the command to restrict some capability.

This message can be altered from time to time to discourage counterfeit CSTs from using this command "enable if closer". Generally, however, a client and his or her cellular telephone might enter a zone, and remain in the zone for a random amount of time before exiting from the zone. In order to honor this "enable if closer" command when the message changes, the message sent with the command, that later becomes overridden, is saved in the cellular telephone, and a predetermined number N, of most recently issued messages originating from TFI 210 and sent through the tree in FIG. 12, are stored in the CST, such as 215, that sends the "enable if closer" command. These N messages are repeatedly sent by CST 215 in a rotation. In the cellular telephone, if any of the N aforementioned "enable if closer" command messages matches the original overridden command's message sent from TFI 210, and saved in the cellular telephone, then and only then, the "enable if closer" command is honored.

When the command "mind the charger" is sent by the CST, a message will be sent that contains a unique number that is recognizable by the cellular telephone; it will ring, or a visual indicator will indicate, if it has not been plugged in to a recharging cradle within a predetermined time, say 15 minutes. This command is caused by the administrator changing screen 203's bottom line from "Mind The Charger:Off" to "Mind The Charger:On". It is communicated in the packet 180 sent to the cellular telephone by setting another bit of bit vector 181, and putting the desired unique number in message field 186. The implementation of this command would be mostly done in microcontroller 230. Upon receipt of the aforementioned packet, if the microcontroller determines that power is not being supplied from the cradle, but the cellular telephone battery voltage is low, indicating that it needs charging, some fifteen minutes have elapsed in this condition, and the message 186 received in the packet matches a the number stored in the cellular telephone, then microcontroller would cause ringer 234 to ring with a distinctive tone that the client recognizes as a request to put the cellular telephone in its cradle.

A cellular telephone cradle could be fitted with a CST that always sends the "Mind The Chanrger:On" command, with the message that matches the message stored in the cellular telephone that is mated with this aforementioned cradle. The TFI would be unnecessary for this application. This specialized CST would only implement the aforementioned Chanrger:On" command, but the zone-aware client's cellular telephone should honor all commands rather than just this single Chanrger:On" command, so that a market is thereby created for multi-purpose TFI and CST systems.

This command is intended for users who forget to recharge their cellular telephone battery. They generally put the cellular telephone in the same place when they come home. A CST positioned near that place would broadcast this command, and the cellular telephone would wait for the predetermined time, longer than the client usually is in that area when they are merely temporarily waiting but not going to sleep. The ringing would alert them that they are not charging their cellular telephone battery. This should cause them to plug their cellular telephone into its charger. The message sent out over the ultrasonic or low-power radio frequency channel would be a unique number that is recognized by only one cellular telephone, so that if a client's cellular telephone were near another person's charger, the ringing would be avoided. This command could also be used to remind clients to plug in other battery-operated devices which use rechargeable batteries, including lap-top computers, digital and video cameras, and toys.

Each of these commands is sent from the TFI with a 24-bit time duration 183, in seconds. Screen 206's bottom two lines hold the current time, which is updated once per second, and screen 204's bottom two lines hold the time when the command is to be cancelled in the cellular telephone. The difference between the latter and former is put into packet field 183; upon receipt of he packet the cellular telephone inserts this number into a counter, which is decremented each second until it becomes zero. When this timeout expires without receiving the command, the cellular telephone will return to its previous state. A short timeout, such as five seconds, should be used where many CSTs are placed in the zone, since each CST waits about a second before it sends a message, to prevent interference with other CST's signals. Waiting five seconds would give the cellular telephone about five tries to get the command, but would not seriously impair the client who leaves the zone with having to wait a long time before the cellular telephone is not restricted. The client might have to wait 5 seconds after leaving the zone. A timeout of an hour or two would be useful for CSTs that are located at entrance to zones, the time being the expected time duration of the event such as a concert or religious service.

Other time variables can be written with values to let the TFI function somewhat automatically, somewhat like a sprinkler system controller which is programmed to sprinkle a lawn starting at a specific time and running to a specific time. The bottom two lines of screen 205 can be used to set a time when the TFI will start sending a command, and the top two lines of screen 204 can be used to set a time when the TFI will stop sending a command.

One skilled in the art of embedded system design could construct and program an unauthorized CST, FTI, or both, to command cellular telephones to enable or restrict modules in them. To make this more difficult, the time-of-day is encrypted and compressed into a field, so that a counterfeit CST or TFI would be significantly more difficult to design and implement than one that does not encrypt the current time. The cellular telephone presently receives the current time-of-day through the main cellular telephone channel. The TFI also keeps track of the time-of day in order to determine the time duration 183 sent with a packet, as discussed in the previous paragraph. The TFI's time-of-day can be passed through a hash function in the TFI module, such as dividing the function's input by a predetermined constant, outputting the remainder truncated to 8 bits, to shorten and encrypt it. The result can be sent within a packet in one-byte field 184, through the CSIs and ultrasonic control signal path. The cellular telephone's current time-of-day can be hash coded using the same hash function, and the packet's hash value can be compared to the packet's hash value, the packet command being ignored if they do not match. To allow for some lack of synchronization between time-of-day values, the hash function of the cellular telephone time of day can be computed for each time-of-day in a range of times-of-day, each such hash function value being tested against the packet's hash function value to see if any of them match. If none match, the packet's command is ignored.

The "auto calling", "enable if closer" and "mind the charger" commands are sent from the CST with a message. As a result of this requirement, these three commands cannot be sent in the same packet at the same time. However, commands that do not use the message and telephone number argument can be simultaneously sent in the same packet and implemented at the same time.

If ultrasonic commands are to be received, generic cellular telephone 101 can be modified by the modification of a cellular telephone mouthpiece 228 to also receive the ultrasonic signals, or else by the addition of a separate ultrasonic receiver. Ultrasonic processing module 229 is also needed to amplify, filter, and detect the ultrasonic signal. It should be recognized that low-power radio-frequency control signals could be used in place of ultrasonic signals in this discussion, using low-power radio-frequency antenna 236 and receiver 235 in place of ultrasonic amplifier, filter and detector 229. It may be advantageous for a cellular telephone to receive both ultrasonic commands and low-power radio-frequency commands, since there are some advantages to both media, and this application's parent patents provide protection to both modes of CST transmission. A preliminary study of whether to use ultrasonic or low-power radio-frequency control signals suggests the following: ultrasonic signals would be better for zones located in highly dense environments since ultrasonic signals should be better contained to the desired zone, being blocked by walls, windows, and closed doors. Ultrasonic signals would be better for the "permit if nearer" command since sound travels slower than radio signals, and the determination of arrival time of two signals is much easier. Low power radio-frequency signals might be better for sparse environments like a church in the middle of parking lot and green space, or zones where client cellular telephones in automobiles should be made aware of the zones they are in. Indeed, some of the CSTs in FIG. 12, such as node 212, could transmit low-power radio-frequency commands instead of ultrasonic commands, while other CSTs in FIG. 12, such as 213, send ultrasonic commands. Ultrasonic and radio-frequency packet transmissions can be synchronized so that they will never be simultaneously transmitted from CSTs that are physically closest to each other, so the client's cellular telephone will not be required to simultaneously track both signals. This property permits computational and logical hardware and software to be shared between the handling of alternative reception of ultrasonic and radio-frequency control signals, rather than be duplicated in a cellular telephone. Also, it should be noted that other implementations of the network of ultrasonic (or low-power radio-frequency) transmitters are possible, without departing from the spirit of this invention. The implementation shown here is mainly shown in order to describe the invention as concretely and clearly as possible. It is, however, an economical implementation that permits the nodes to be implemented using very inexpensive microcontrollers.

This system is expected to be sold in separate parts, which are the cellular telephone apparatus and the control signal transmitter apparatus. It is unlikely that the same person would sell or buy a complete system. Therefore dependent claims are made which claim each of these apparatuses separately.

An important aspect of this invention is its low cost. As noted earlier, both can be implemented with simple hardware and software utilizing the UART. The UART hardware may be on the microcontroller already, or can be added at low cost because UART designs are widely reproduced. The restricted device microcontroller's program need not be greatly expanded. Thus the hardware and software needed to implement this valuable function in cellular telephones will not be expensive. Finally, TFIs and CSTs will similarly be inexpensive.

As opposed to a radio-interference device, this inventive system does not jam a radio-frequency signal carrier. Unidirectional or bidirectional radio transmission may be still permitted, while objectionable audible or radio-frequency output is muted. As opposed to infrared remote controls, which mute television sets and similar home entertainment devices, this inventive system broadcasts the same mute control signal from possibly more than one transmitter to all receivers. By contrast, infrared remote controls for T.V.s and stereos are designed, as much as possible, to control just one device from one transmitter, such that other devices ignore the control. Finally, this inventive device solves an onerous problem, as restricted devices are widely used and are expected to become even more widely used, which no other known system attempts to solve.

I claim:

1. A system for causing, enabling or disabling the use of controllable modules in courteous cellphones located in a zone, said courteous cellphones being conventional cellphones enhanced to receive and utilize control signals to implement this application's operations, said system comprising:
   (a) a nonempty set of control signal transmitters, each said transmitter transmitting a packet comprised of control signals and possibly operand data, said control signal and possible operand data not including data derived from cellphone user's personal data, said transmitters either located at an entrance to said zone, or else located throughout said zone and blanketing said zone with said control signals, all of which, whether at an entrance or located throughout the zone, are positioned so that for every pair of said control signal transmitters, said control signal transmitters do not usually interfere with each other's transmissions,
   (b) at least one controllable module ill said courteous cellphone, where control may be either enabling execution of, or restricting execution of, or causing, an operation in said module, in which said operation being caused, disabled or enabled may require the input of some data; said controllable module not being a power supply supplying power to RF transmitter and speaker; and
   (c) a receiver module within said courteous cellphone which, upon receiving said packet, sends control signals and possibly operate data from said packet's fields to selected said controllable modules; wherein said control signals, and possibly data value, operates on said module responsive to said packet field's data, or provides data for said operation, for a predetermined period of time after receipt of said control signal.

2. A system as defined in claim 1 wherein said module is a speaker or earpiece for outputting audible signals, and said control prevents said speaker or earpiece from emitting sound.

3. A system as defined in claim 1 wherein said module is a microphone or mouthpiece for inputting audible signals to other modules in said cellular telephone, and said control prevents said microphone or mouthpiece from inputting audible signals to other cellular telephone modules.

4. A system as defined in claim 1 wherein said module is a video moving picture or still picture camera for inputting video signals to other modules in said cellular telephone, and said control prevents said video moving picture or still picture camera from inputting video signals to other cellular telephone modules.

5. A system as defined in claim 1 wherein said module is a display for displaying video or text messages in said cellular telephone, and said control prevents said display from displaying said video signals or text messages.

6. A system as defined in claim 1 where said module is a cellular telephone keyboard and microcontroller keyboard interface for inputting telephone numbers into said cellular telephone, and said control prevents said microcontroller keyboard interface and keyboard from inputting keystroke information to said other modules in said cellular telephone.

7. A system as defined in claim 1 wherein said module is a cellular telephone microcontroller for operating on signals and data in said cellular telephone, and said control prevents said microcontroller from executing instructions.

8. A system as defined in claim 1 wherein said module is a low-power identification signal transmitter that renders said cellular telephone locatable to law-enforcement personnel, and said control causes said low-power identification signal transmitter to emit low-power identification signals.

9. A system as defined in claim 1 wherein said module is a cellular telephone microcontroller storing a program capable of dialing a telephone number and sending a message to said dialed telephone; wherein said control causes said microcontroller to dial said number and send said message, both of which are provided by fields in said packet, to said dialed telephone, and thereafter to communicate interactively with said dialed telephone.

10. A system as defined in claim 9 wherein said dialed telephone communicates interactively by sending said cellular telephone a text message right after receiving a packet.

11. A system as defined in claim 10 wherein, responsive to said text message, the client enters digits which are transmitted from said client's cellular telephone to said dialed telephone.

12. A system as defined in claim 11 wherein said digits transmitted from said client's cellular telephone to said dialed telephone includes a personal identification number.

13. A system as defined in claim 11 wherein said digits transmitted from said client's cellular telephone to said dialed telephone includes a catalog number for selecting an item identified in a catalog, or a list of alternative items.

14. A system as defined in claim 11 wherein said digits transmitted from said client's cellular telephone to said dialed telephone includes a number of items to be bought or sold.

15. A system as defined in claim 11 wherein said message received at said dialed telephone selects a video or still camera picture, or text or graphic image, which is sent from said dialed telephone to said client's cellular telephone.

16. A system for selectively removing the restriction on the use of a cellular telephone in a zone that is otherwise restricted as described in claim 1, comprising: a first system according to claim 1 that inhibits an operation of a module in the cellular telephone, having a first control signal transmitter that transmits a first control signal; a second system according to claim 1 that cancels the prohibition of said operation of the cellular telephone, having a second control signal transmitter that transmits a second control signal, and having the same cellular telephone that is in the first system; said control signals being transmitted synchronously so that first and second control signals are not transmitted at the same time; and said cellular telephone including a receiver module within the cellular telephone responsive to said first and second controls signal for generating a first command upon receipt of said first control signal, and for generating a second command upon receipt of said second control signal; wherein upon receipt of said second control signal, said second command cancels the effect of said first command.

17. A cellular telephone apparatus as defined in claim 1.

18. A control signal transmitter apparatus as defined in claim 1.

* * * * *